(12) United States Patent
Oguro

(10) Patent No.: US 11,993,265 B2
(45) Date of Patent: May 28, 2024

(54) CONTROL APPARATUS

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 39 days.

(21) Appl. No.: 17/443,829

(22) Filed: Jul. 28, 2021

(65) Prior Publication Data

US 2022/0055627 A1 Feb. 24, 2022

(30) Foreign Application Priority Data

Aug. 20, 2020 (JP) ................. 2020-139416

(51) Int. Cl.
*B60W 30/18* (2012.01)
*B60L 15/20* (2006.01)
*B60W 40/105* (2012.01)

(52) U.S. Cl.
CPC .... *B60W 30/18172* (2013.01); *B60W 40/105* (2013.01); *B60L 15/20* (2013.01);
(Continued)

(58) Field of Classification Search
CPC ......... B60W 30/18172; B60W 40/105; B60W 2520/10; B60W 2520/12; B60W 2520/28; B60W 2530/00; B60W 2540/18; B60W 2720/26; B60L 15/20; B60L 3/104; B60L 3/106; B60L 50/51; B60L 2220/42; B60L 2220/46; B60L 2240/12; B60L 2240/20; B60L 2240/24; B60L 2240/461; B60L 2240/465; B60L 2260/28; Y02T 10/64; Y02T 10/70

See application file for complete search history.

(56) References Cited

U.S. PATENT DOCUMENTS 7,739,005 B1 * 6/2010 Tang ................... B60L 3/10
701/69
8,527,124 B2 * 9/2013 Velde .................. B60L 3/104
701/50
(Continued)

FOREIGN PATENT DOCUMENTS

JP H06-107155 A 4/1994
JP 2007-49825 A 2/2007
(Continued)

OTHER PUBLICATIONS

KR-20190065629-A translation (Year: 2019).*
(Continued)

*Primary Examiner* — Jason Holloway
*Assistant Examiner* — Kyle T Johnson
(74) *Attorney, Agent, or Firm* — TROUTMAN PEPPER HAMILTON SANDERS LLP

(57) ABSTRACT

A control apparatus to be applied to a vehicle includes an acquiring unit and an estimator. The acquiring unit is configured to acquire wheel speeds of respective wheels of the vehicle and a steering angle of the vehicle. The estimator is configured to estimate vehicle speeds at respective positions of the respective wheels, on the basis of a minimum wheel speed among the wheel speeds of the respective wheels and the steering angle.

3 Claims, 5 Drawing Sheets

(52) U.S. Cl.
CPC ..... *B60W 2520/10* (2013.01); *B60W 2520/12* (2013.01); *B60W 2520/28* (2013.01); *B60W 2530/00* (2013.01); *B60W 2540/18* (2013.01); *B60W 2720/26* (2013.01)

(56) References Cited

U.S. PATENT DOCUMENTS

| | | | | |
|---|---|---|---|---|
| 9,463,697 | B1* | 10/2016 | Gauthier | B60L 15/20 |
| 2002/0002433 | A1* | 1/2002 | Matsuno | B60K 23/0808 |
| | | | | 701/67 |
| 2002/0153770 | A1* | 10/2002 | Matsuno | B60W 30/02 |
| | | | | 303/146 |
| 2004/0262067 | A1* | 12/2004 | Sawada | B60K 28/165 |
| | | | | 180/282 |
| 2007/0038340 | A1 | 2/2007 | Sekiguchi et al. | |
| 2010/0198448 | A1* | 8/2010 | Ono | B60W 40/105 |
| | | | | 701/31.4 |
| 2013/0231838 | A1* | 9/2013 | Shiozawa | B60L 3/102 |
| | | | | 701/32.9 |
| 2013/0245900 | A1* | 9/2013 | Fukushima | G06F 17/00 |
| | | | | 701/1 |
| 2015/0046034 | A1* | 2/2015 | Kikuchi | B60G 17/018 |
| | | | | 701/37 |
| 2016/0163128 | A1* | 6/2016 | Yamaguchi | G07C 5/08 |
| | | | | 701/31.1 |
| 2017/0247038 | A1* | 8/2017 | Savaresi | B60W 40/107 |
| 2017/0341652 | A1* | 11/2017 | Sugawara | G08G 1/166 |
| 2018/0134152 | A1* | 5/2018 | Nagayama | B60W 40/072 |
| 2019/0308611 | A1* | 10/2019 | Lee | B60W 40/101 |
| 2020/0180590 | A1* | 6/2020 | Jung | B60W 10/184 |
| 2020/0189388 | A1* | 6/2020 | Bittner | B60K 23/08 |
| 2021/0309114 | A1* | 10/2021 | Nordmann | B60K 6/52 |

FOREIGN PATENT DOCUMENTS

| | | | |
|---|---|---|---|
| JP | 2010-076584 A | | 4/2010 |
| JP | 2011-139561 A | | 7/2011 |
| KR | 20190065629 A | * | 6/2019 |
| KR | 20190141967 A | * | 12/2019 |

OTHER PUBLICATIONS

KR-20190141967-A translation (Year: 2019).*
Japanese Office Action issued in corresponding JP Application No. 2020-139416, dated Mar. 12, 2024, related to U.S. Appl. No. 17/443,829.

* cited by examiner

CONTROL APPARATUS

CROSS-REFERENCE TO RELATED APPLICATIONS

The present application claims priority from Japanese Patent Application No. 2020-139416 filed on Aug. 20, 2020, the entire contents of which are hereby incorporated by reference.

BACKGROUND

The technology relates to a control apparatus.

With an aim of stabilizing a behavior of a body of a vehicle, a technique has been proposed that is related to a slip suppression control that suppresses a slip of a wheel. For example, Japanese Unexamined Patent Application Publication No. 2007-049825 discloses a technique that suppresses a slip of a wheel by reducing a drive torque of a vehicle upon an occurrence of the slip of the wheel.

SUMMARY

An aspect of the technology provides a control apparatus to be applied to a vehicle. The control apparatus includes an acquiring unit and an estimator. The acquiring unit is configured to acquire wheel speeds of respective wheels of the vehicle and a steering angle of the vehicle. The estimator is configured to estimate vehicle speeds at respective positions of the respective wheels, on the basis of a minimum wheel speed among the wheel speeds of the respective wheels and the steering angle.

An aspect of the technology provides a control apparatus to be applied to a vehicle. The control apparatus includes circuitry configured to acquire wheel speeds of respective wheels of the vehicle and a steering angle of the vehicle, and estimate vehicle speeds at respective positions of the respective wheels, on the basis of a minimum wheel speed among the wheel speeds of the respective wheels and the steering angle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
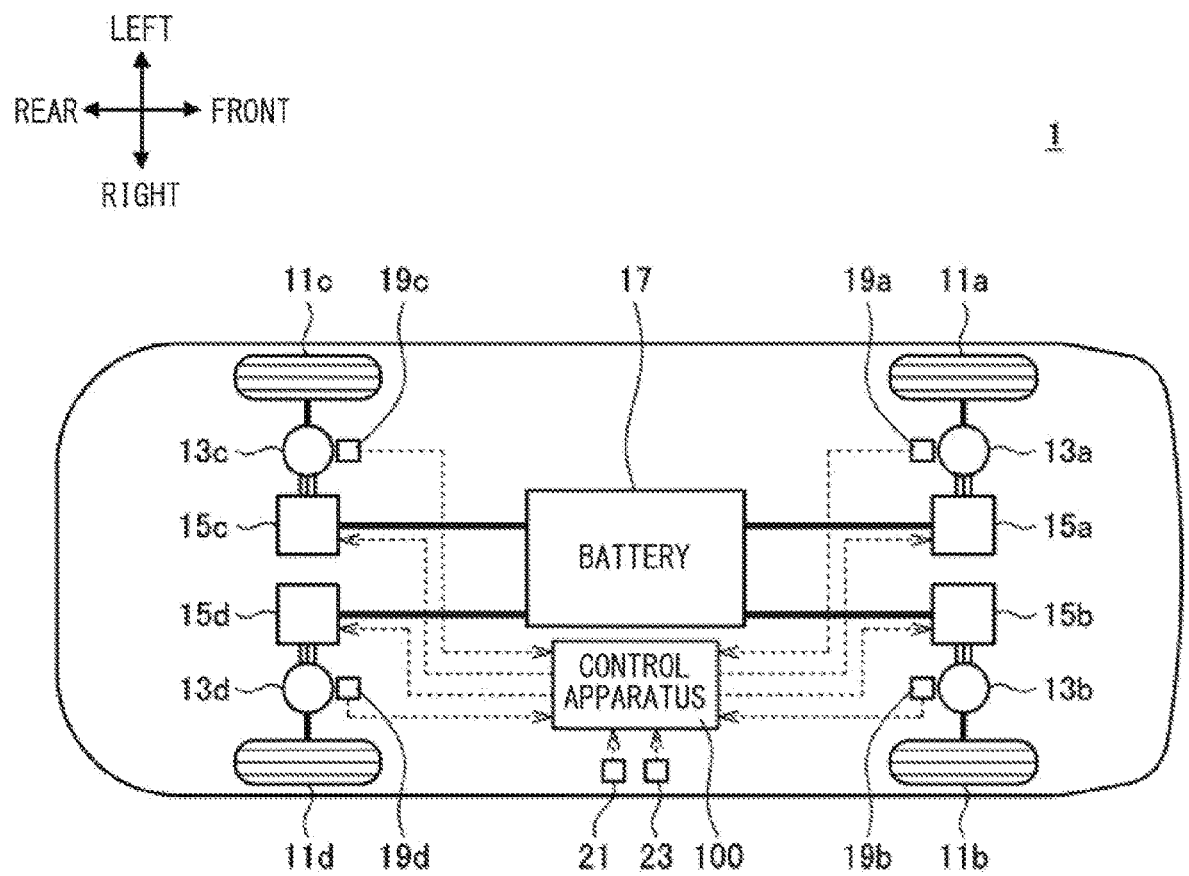
FIG. 1 is a diagram schematically illustrating an example of a configuration of a vehicle on which a control apparatus according to one example embodiment of the technology is mounted.

A slip suppression control so controls a slip rate of a wheel as to cause the slip rate to be closer to a target slip rate. The slip rate is calculated on the basis of a wheel speed and a vehicle speed. It is to be noted here that vehicle speeds at respective positions of wheels differ depending on the wheels upon turning of a vehicle, due to a difference between trajectories traced by front and rear inner wheels, or an "inner wheel difference". Existing techniques, however, often use a speed of a body of a vehicle as the vehicle speed upon calculating the slip rate. The speed of the body of the vehicle is based on a speed at the middle of the body of the vehicle. Accordingly, a calculated value of the slip rate can deviate from the actual slip rate. This can make it difficult to appropriately control the slip rate upon execution of the slip suppression control. This can also lead to a decrease in an accuracy of making a slip determination that determines whether a slip of a wheel has occurred.

It is desirable to provide a control apparatus that makes it possible to appropriately estimate vehicle speeds at respective positions of wheels.

In the following, some embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Figure 2:
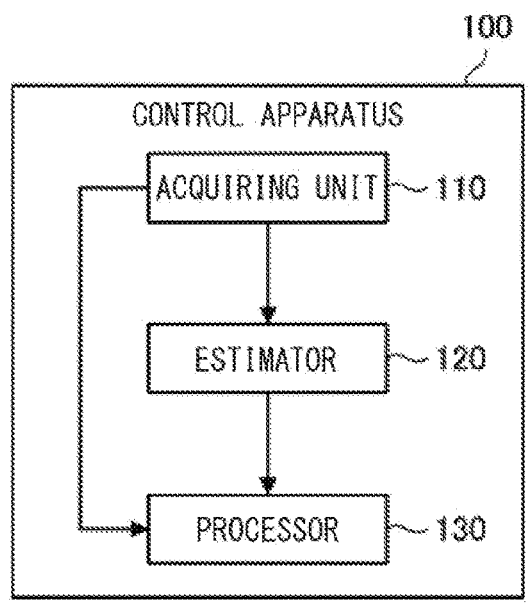
FIG. 2 is a block diagram illustrating an example of a configuration of the control apparatus according to one example embodiment of the technology.

Described below, with reference to FIGS. 1 and 2, is a configuration of a vehicle 1 on which a control apparatus 100 according to an example embodiment of the technology is mounted.

FIG. 1 schematically illustrates a configuration of the vehicle 1, where a forward-traveling direction of the vehicle 1 is defined as a front direction and a backward-traveling direction of the vehicle 1 on the opposite side of the forward-traveling direction is defined as a rear direction. Further, FIG. 1 illustrates the vehicle 1, where the left side and the right side of the vehicle 1 with the vehicle 1 facing the front direction are respectively defined as a left direction and a right direction.

The vehicle 1 may be an electric vehicle that includes a drive motor as a drive source and travels by means of a torque outputted from the drive motor.

Note that the vehicle 1 described below is an illustrative example of a vehicle on which the control apparatus according to any embodiment of the technology may be mounted. A configuration of a vehicle on which the control apparatus according to any embodiment of the technology is to be mounted is not necessarily limited to the configuration of the vehicle 1.

Referring to FIG. 1, the vehicle 1 may include a left front wheel 11a, a right front wheel 11b, a left rear wheel 11c, a right rear wheel 11d, a left front wheel drive motor 13a, a right front wheel drive motor 13b, a left rear wheel drive motor 13c, and a right rear wheel drive motor 13d. The vehicle 1 may further include inverters 15a, 15b, 15c, and 15d, a battery 17, a left front wheel motor rotational speed sensor 19a, a right front wheel motor rotational speed sensor 19b, a left rear wheel motor rotational speed sensor 19c, a right rear wheel motor rotational speed sensor 19d, a steering angle sensor 21, a vehicle body speed sensor 23, and the control apparatus 100.

In the following description, the left front wheel 11a, the right front wheel 11b, the left rear wheel 11c, and the right rear wheel 11d may also be simply referred to as a wheel 11 in a case where it is not necessary to distinguish them from one another. Similarly, the left front wheel drive motor 13a, the right front wheel drive motor 13b, the left rear wheel drive motor 13c, and the right rear wheel drive motor 13d may also be simply referred to as a drive motor 13 in a case where it is not necessary to distinguish them from one another. The inverters 15a, 15b, 15c, and 15d may also be simply referred to as an inverter 15 in a case where it is not necessary to distinguish them from one another. The left front wheel motor rotational speed sensor 19a, the right front wheel motor rotational speed sensor 19b, the left rear wheel motor rotational speed sensor 19c, and the right rear wheel motor rotational speed sensor 19d may also be simply referred to as a motor rotational speed sensor 19 in a case where it is not necessary to distinguish them from one another.

The left front wheel drive motor 13a may be coupled to the left front wheel 11a, and output a torque that drives the left front wheel 11a. The right front wheel drive motor 13b may be coupled to the right front wheel 11b, and output a torque that drives the right front wheel 11b. The left rear wheel drive motor 13c may be coupled to the left rear wheel 11c, and output a torque that drives the left rear wheel 11c. The right rear wheel drive motor 13d may be coupled to the right rear wheel 11d, and output a torque that drives the right rear wheel 11d.

The drive motor 13 may be a polyphase alternating-current motor, for example. The left front wheel drive motor 13a may be coupled to the battery 17 via the inverter 15a. The right front wheel drive motor 13b may be coupled to the battery 17 via the inverter 15b. The left rear wheel drive motor 13c may be coupled to the battery 17 via the inverter 15c. The right rear wheel drive motor 13d may be coupled to the battery 17 via the inverter 15d. A direct-current power supplied from the battery 17 may be converted into an alternating-current power by each of the inverters 15, and the thus-converted alternating-current power may be supplied to corresponding one of the drive motors 13. Each of the drive motors 13 may be driven by means of the electric power supplied from the battery 17.

The drive motor 13 may have a function as a generator that generates electricity by means of a kinetic energy of the wheel 11, in addition to a function of outputting the drive torque of the wheel 11. In a case where the drive motor 13 functions as the generator, the drive motor 13 may generate electricity, and a braking force based on regenerative braking may be applied to the vehicle 1. An alternating-current power generated by the drive motor 13 may be converted into a direct-current power by the inverter 15, and the thus-converted direct-current power may be supplied to the battery 17, allowing the battery 17 to be charged.

The left front wheel motor rotational speed sensor 19a may detect a rotational speed of the left front wheel drive motor 13a, and output a result of detection of the rotational speed. The rotational speed of the left front wheel drive motor 13a to be detected by the left front wheel motor rotational speed sensor 19a may serve as data that indicates a wheel speed of the left front wheel 11a.

The right front wheel motor rotational speed sensor 19b may detect a rotational speed of the right front wheel drive motor 13b, and output a result of detection of the rotational speed. The rotational speed of the right front wheel drive motor 13b to be detected by the right front wheel motor rotational speed sensor 19b may serve as data that indicates a wheel speed of the right front wheel 11b.

The left rear wheel motor rotational speed sensor 19c may detect a rotational speed of the left rear wheel drive motor 13c, and output a result of detection of the rotational speed. The rotational speed of the left rear wheel drive motor 13c to be detected by the left rear wheel motor rotational speed sensor 19c may serve as data that indicates a wheel speed of the left rear wheel 11c.

The right rear wheel motor rotational speed sensor 19d may detect a rotational speed of the right rear wheel drive motor 13d, and output a result of detection of the rotational speed. The rotational speed of the right rear wheel drive motor 13d to be detected by the right rear wheel motor rotational speed sensor 19d may serve as data that indicates a wheel speed of the right rear wheel 11d.

The steering angle sensor 21 may detect a steering angle of a steering wheel provided in the vehicle 1, and output a result of detection of the steering angle.

The vehicle body speed sensor 23 may detect a vehicle body speed and output a result of detection of the vehicle body speed. The vehicle body speed may be a speed at the middle of a body of the vehicle 1. For example, the vehicle body speed may be detected by the vehicle body speed sensor 23 on the basis of an acceleration of the vehicle 1, or on the basis of a global positioning system (GPS) signal.

The control apparatus 100 may have devices including a central processing unit (CPU) as an arithmetic processing unit, a read only memory (ROM), and a random-access memory (RAM). The ROM may be a memory element that stores a program, a calculation parameter, etc., that are to be used by the CPU. The RAM may be a memory element that temporarily holds, for example, a parameter that changes as appropriate for execution by the CPU.

The control apparatus 100 may communicate with each device provided in the vehicle 1. For example, the control apparatus 100 may communicate with devices including each inverter 15, each motor rotational speed sensor 19, the steering angle sensor 21, and the vehicle body speed sensor 23. The communication to be performed between the control apparatus 100 and each device may be a controller area network (CAN) communication, for example.

Note that a plurality of block components of the control apparatus 100 according to an example embodiment may be divided by a plurality of control apparatuses to be executed by the plurality of control apparatuses. Alternatively, the plurality of block components may be executed by a single control apparatus. In some embodiments where the plurality of block components of the control apparatus 100 is divided by the plurality of control apparatuses to be executed by the plurality of control apparatuses, the plurality of apparatuses may be coupled to each other via a communication bus such as the CAN.

FIG. 2 is a block diagram illustrating an example of a configuration of the control apparatus 100.

Referring to FIG. 2, the control apparatus 100 includes an acquiring unit 110 and an estimator 120, for example. The control apparatus 100 may also include a processor 130.

The acquiring unit 110 may acquire various pieces of data to be used for processes that are to be performed by the estimator 120 and the processor 130, and output the acquired pieces of data to the estimator 120 and the processor 130. In some embodiments, the acquiring unit 110 may acquire pieces of data from each motor rotational speed sensor 19, the steering angle sensor 21, and the vehicle body speed sensor 23.

The estimator 120 estimates vehicle speeds at respective positions of the wheels 11. The vehicle speeds at the respective positions of the wheels 11 estimated by the estimator 120 may be utilized by a process to be performed by the processor 130. Note that a process that is related to the estimation of the vehicle speeds at the respective positions of the wheels 11 and that is to be performed by the estimator 120 will be described later in greater detail.

The processor 130 may control an operation of each device provided in the vehicle 1 to control traveling of the vehicle 1. For example, the processor 130 may control an operation of each of the drive motors 13.

The processor 130 may control an operation of switching devices provided in each of the inverters 15 to control a supply of the electric power performed between the battery 17 and each of the drive motors 13. The processor 130 may thereby control the torque to be outputted from each of the drive motors 13. The processor 130 may control operations of the respective drive motors 13 individually to control the torques of the respective wheels 11 individually.

The processor 130 may control a slip rate of the wheel 11 by controlling the torque of the wheel 11. For example, the processor 130 may perform a torque-down control as an example of a slip suppression control that suppresses a slip of the wheel 11, in a case where the processor 130 determines that the slip of the wheel 11 has occurred. The torque-down control may reduce the torque of the wheel 11 with respect to a requested torque. The slip may refer to a phenomenon in which the wheel 11 idles, and occur when, for example, the vehicle 1 has entered a road with low μ. The processor 130 may determine that the slip of the wheel 11 has occurred in a case where, for example, the slip rate of the wheel 11 has exceeded a reference slip rate.

Described next, with reference to FIGS. 3 to 7, is an operation of the control apparatus 100 according to an example embodiment of the technology.

The processor 130 may perform the torque-down control in a case where the processor 130 determines that the slip of the wheel 11 has occurred as described above. Upon the torque-down control, the processor 130 may so control the torque of the wheel 11 as to cause the slip rate of the wheel 11 to be closer to a target slip rate. The target slip rate may be set to a value that is within a range that allows a gripping force to be effectively recovered. The gripping force may be a frictional force generated between a tire of the wheel 11 and a road surface.

Figure 3:
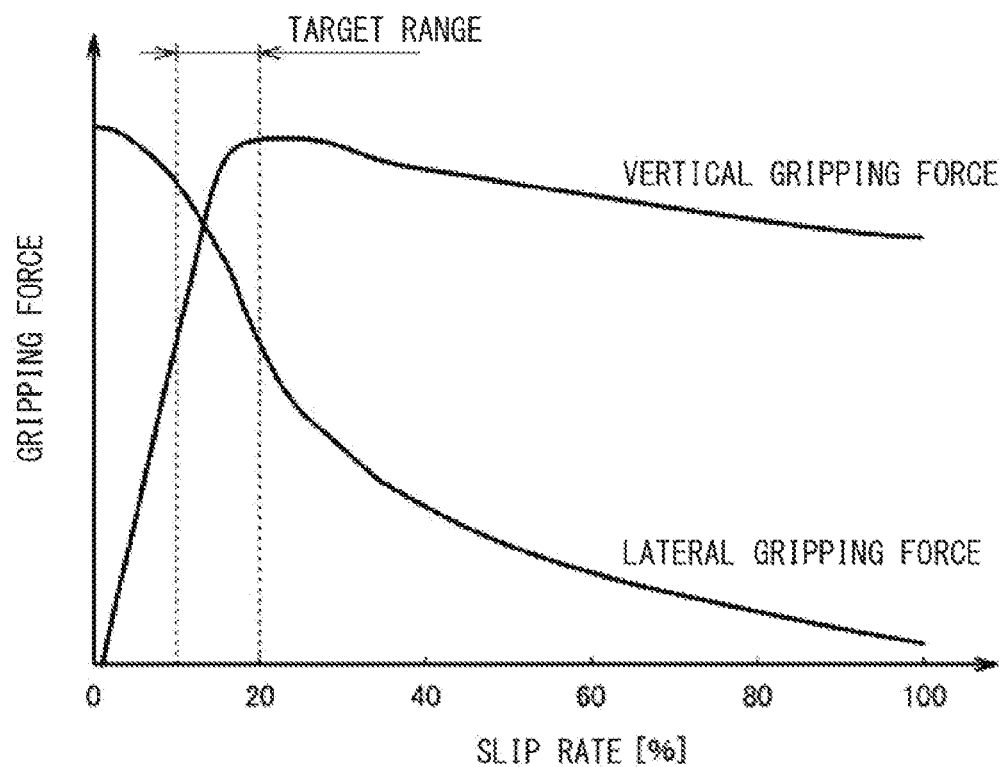
FIG. 3 is a diagram schematically illustrating a relationship between a slip rate and a gripping force.

FIG. 3 schematically illustrates a relationship between the slip rate and the gripping force. Referring to FIG. 3, in general, a vertical gripping force as a component in a traveling direction of the gripping force increases in the course of an increase in the slip rate of the wheel 11 from 0% to about 20%, and decreases thereafter in the course of the increase in the slip rate of the wheel 11. Further, in general, a lateral gripping force as a component perpendicular to the traveling direction of the gripping force decreases as the slip rate of the wheel 11 increases. Hence, it is preferable that the slip rate of the wheel 11 be adjusted to fall within a target range from about 10% to about 20%, in order to achieve both the vertical gripping force and the lateral gripping force at their higher levels. Accordingly, for example, the target slip rate may be set to a value that falls within the target range described above that allows the gripping force of the tire of the wheel 11 to be effectively recovered.

Figure 4:
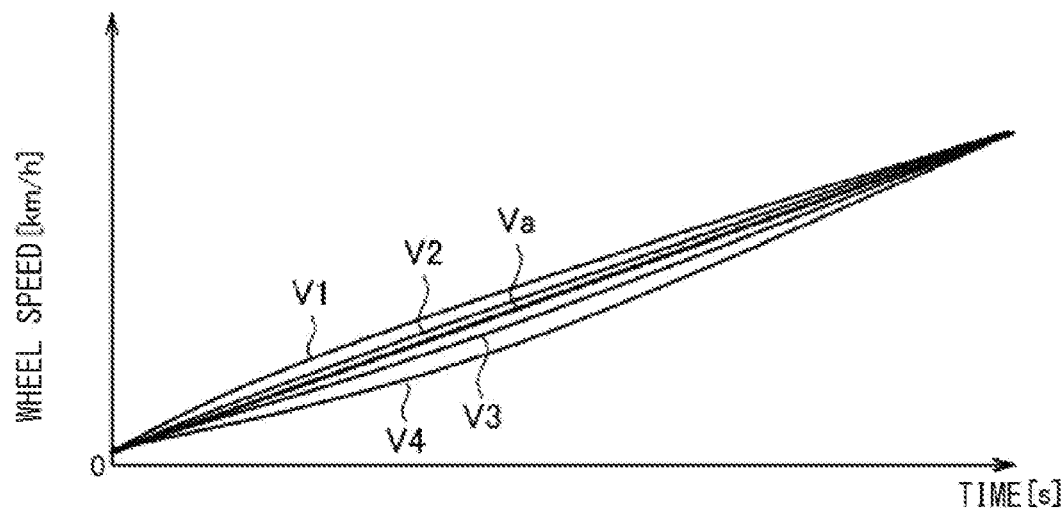
FIG. 4 is a diagram schematically illustrating an example of wheel speeds of respective wheels upon making a turn, in a case where no slip of the wheels is occurred.

FIG. 4 schematically illustrates an example of wheel speeds of the respective wheels 11 upon making a turn, in a case where no slip of the wheel 11 is occurred. FIG. 4 illustrates transitions of wheel speeds V1, V2, V3, and V4 of the respective wheels 11 and a transition of an average value Va of those wheel speeds V1, V2, V3, and V4. The slip rate of the wheel 11 that involves no occurrence of the slip is 0%, meaning that the vehicle speed of that wheel 11 coincides with the vehicle speed at the position of that wheel 11. Note that the wheel speeds V1, V2, V3, and V4 of the respective wheels 11 differ from each other due to the inner wheel difference upon turning of the vehicle 1, even in a case where no slip of the wheel 11 is occurred. In other words, the vehicle speeds at the respective positions of the wheels 11 differ depending on the wheels 11.

Figure 5:
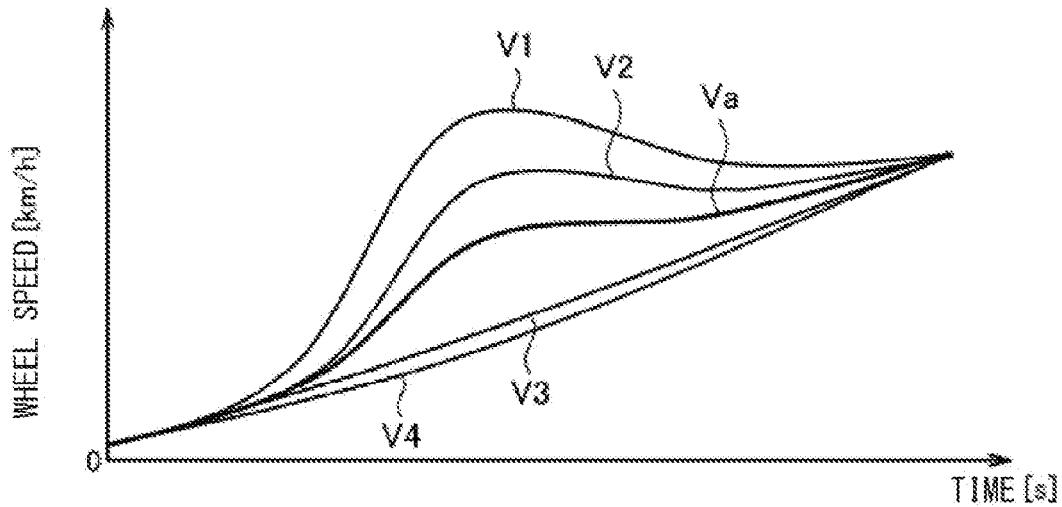
FIG. 5 is a diagram schematically illustrating an example of wheel speeds of the respective wheels upon making a turn, in a case where the slip of the wheels is occurred.

FIG. 5 schematically illustrates an example of wheel speeds of the respective wheels 11 upon making a turn, in a case where the slip of the wheels 11 is occurred. FIG. 5 illustrates transitions of the wheel speeds V1, V2, V3, and V4 of the respective wheels 11 and a transition of the average value Va of those wheel speeds V1, V2, V3, and V4 as with FIG. 4. In an example illustrated in FIG. 5, the slip is occurred for the wheels 11 corresponding to the wheel speeds V1 and V2. Hence, the wheel speeds V1 and V2 are greater than those in an example illustrated in FIG. 4.

It is to be noted that a vehicle body speed as a speed at the middle of a body of a vehicle is used as a vehicle speed upon a calculation of a slip rate in an existing technique. For example, a resultant value of a division of a difference between a wheel speed and the vehicle body speed by the vehicle body speed is calculated as the slip rate. As described above, however, the vehicle speeds at the respective positions of the wheels 11 differ depending on the wheels 11 upon turning of the vehicle 1. Accordingly, a calculated value of the slip rate can deviate from the actual slip rate in a case where, upon the calculation of the slip rate, the vehicle body speed is used as the vehicle speed that is to be compared with the wheel speed. This can make it difficult to appropriately control the slip rate upon execution of the torque-down control. This can also lead to a decrease in an accuracy of making a slip determination that determines whether the slip of the wheel 11 has occurred.

According to an example embodiment of the technology, the estimator 120 estimates the vehicle speeds at the respective positions of the wheels 11, on the basis of a minimum wheel speed among the wheel speeds of the respective wheels 11 and the steering angle. Thus, it is possible to appropriately estimate the vehicle speeds at the respective positions of the wheels 11. Hence, it is possible to optimize a control of the slip rate and the slip determination. In the following, a process that is to be performed by the control apparatus 100 and related to the estimation of the vehicle speeds at the respective positions of the wheels 11 is described in detail with reference to a flowchart illustrated in FIG. 6.

Figure 6:
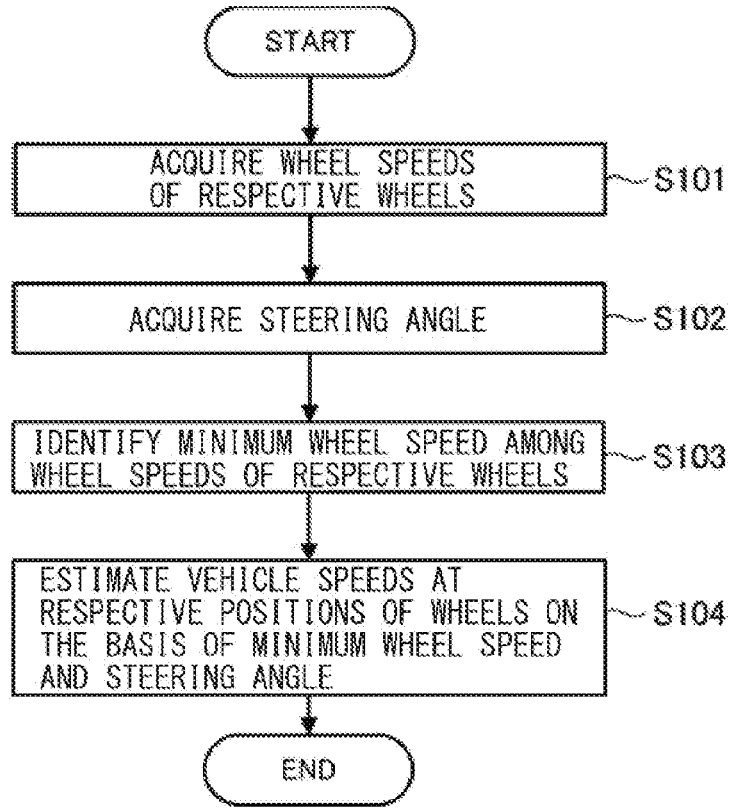
FIG. 6 is a flowchart illustrating an example of a flow of a process that is to be performed by the control apparatus according to one example embodiment of the technology and that is related to an estimation of vehicle speeds at respective positions of the wheels.

FIG. 6 is a flowchart illustrating an example of a flow of the process that is to be performed by the control apparatus 100 and related to the estimation of the vehicle speeds at the respective positions of the wheels 11. A control flow illustrated in FIG. 6 may be started repeatedly at preset intervals.

Upon the start of the control flow illustrated in FIG. 6, the acquiring unit 110 may first acquire the wheel speeds of the respective wheels 11 in step S101. In some embodiments, the acquiring unit 110 may acquire, as the wheel speeds of the respective wheels 11, the rotational speeds of the respective drive motors 13 acquired by the respective corresponding motor rotational speed sensors 19.

Thereafter, in step S102, the acquiring unit 110 may acquire the steering angle. In some embodiments, the acquiring unit 110 may acquire the steering angle from the steering angle sensor 21.

Thereafter, in step S103, the estimator 120 may identify the minimum wheel speed among the wheel speeds of the respective wheels 11. The wheel speed of the wheel 11 involving the occurrence of the slip is greater than the wheel speed of any other wheel 11. In other words, it is possible to determine that no slip is occurred for the wheel 11 having the minimum wheel speed, except for a particular situation where, for example, all of the wheels 11 involve the slip. Hence, the wheel speed of the wheel 11 having the minimum wheel speed basically coincides with the vehicle speed at the position of that wheel 11.

Thereafter, in step S104, the estimator 120 may estimate the vehicle speeds at the respective positions of the wheels 11, on the basis of the minimum wheel speed and the steering angle. Thereafter, the control flow illustrated in FIG. 6 may end.

Figure 7:
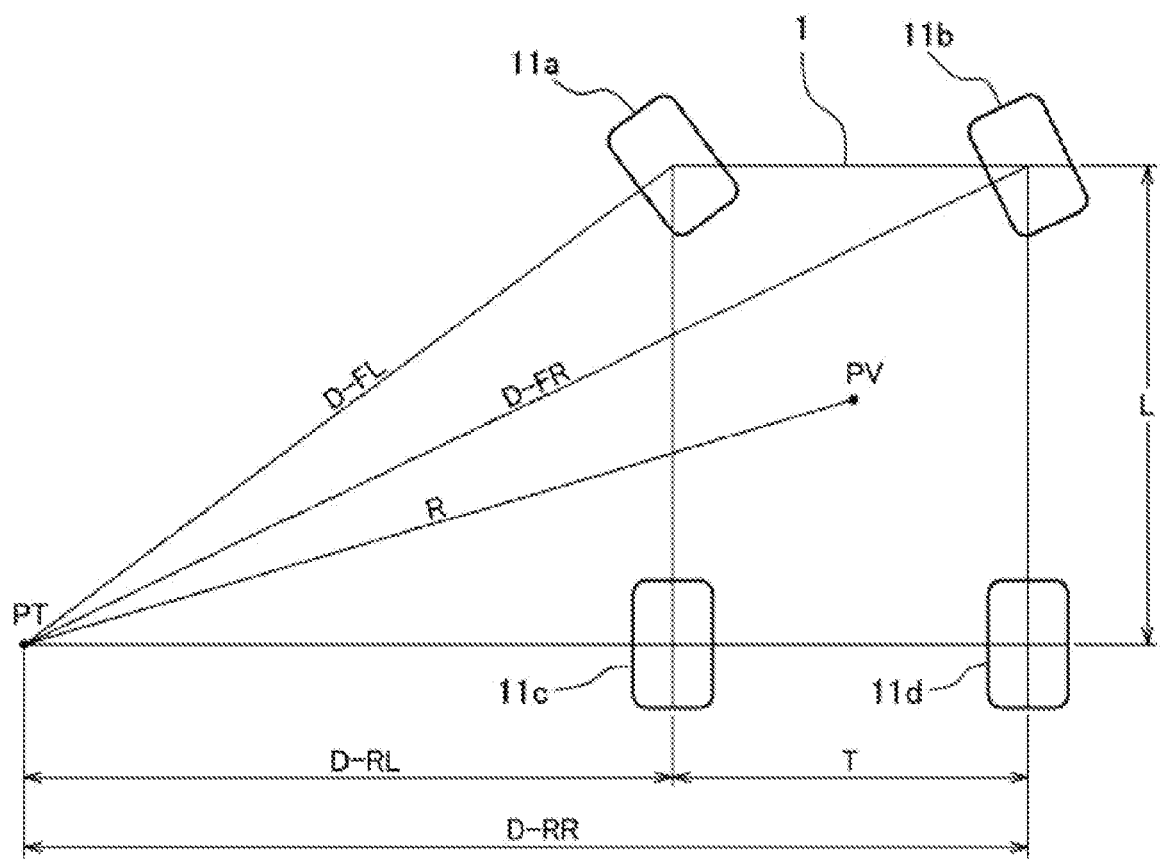
FIG. 7 is a diagram schematically illustrating a positional relationship between the turning center of the vehicle and each of the wheels.

FIG. 7 schematically illustrates a positional relationship between a turning center PT of the vehicle 1 and each of the wheels 11. FIG. 7 illustrates an example in which the vehicle 1 turns to the left side with respect to the traveling direction. For example, the estimator 120 may estimate the vehicle speeds at the respective positions of the wheels 11, on the basis of a relationship between the steering angle and a turning radius R of the vehicle 1, and on the basis of a relationship between the turning radius R and distances from the turning center PT of the vehicle 1 to the respective wheels 11. In the following, described is an example embodiment in which the estimator 120 geometrically estimates the vehicle speeds at the respective positions of the wheels 11 by utilizing the Ackermann theory.

For example, the estimator 120 may identify the turning radius R of the vehicle 1 on the basis of the steering angle. The turning radius R becomes smaller as the steering angle becomes larger. Thereafter, the estimator 120 may identify a position of the turning center PT on the basis of the turning radius R. The turning center PT is positioned on a straight line that connects the center of the left rear wheel 11c and the center of the right rear wheel 11d, as is away from a vehicle body center PV by the turning radius R. The estimator 120 may identify the position of the turning center PT on the basis of a vehicle width T and a vehicle length L of the vehicle 1 in addition to the turning radius R, for example. By identifying the position of the turning center PT, it is possible for the estimator 120 to identify a distance D-FL from the turning center PT to the left front wheel 11a, a distance D-FR from the turning center PT to the right front wheel 11b, a distance D-RL from the turning center PT to the left rear wheel 11c, and a distance D-RR from the turning center PT to the right rear wheel 11d.

A proportion of the vehicle speeds at the respective positions of the wheels 11 coincides with a proportion of the distances from the turning center PT to the respective wheels 11. For example, the vehicle speed at the position of the right rear wheel 11d is 1.5 times the vehicle speed at the position of the left rear wheel 11c, in a case where the distance D-RR from the turning center PT to the right rear wheel 11d is 1.5 times the distance D-RL from the turning center PT to the left rear wheel 11c. Hence, for example, in a case where the wheel speed of the left rear wheel 11c is the minimum wheel speed, the estimator 120 may estimate, as the wheel speed of the right rear wheel 11d, a value that is 1.5 times the value of the wheel speed of the left rear wheel 11c.

Note that a process of estimating the vehicle speeds at the respective positions of the wheels 11 to be performed by the estimator 120 is not necessarily limited to an example embodiment described above. In some embodiments, a map that defines a relationship between the steering angle and the turning radius R of the vehicle 1 and a map that defines a relationship between the turning radius R and the distances from the turning center PT of the vehicle 1 to the respective wheels 11 may be stored in advance in the memory element of the control apparatus 100. In such example embodiments, the estimator 120 may estimate the vehicle speeds at the respective positions of the wheels 11 on the basis of the maps, the minimum wheel speed, and the steering angle.

As described above, determining the steering angle determines the turning radius R, and determining the turning radius R determines the distances from the turning center PT to the respective wheels 11. Accordingly, in an example embodiment, the estimator 120 may estimate the vehicle speeds at the respective positions of the wheels 11, on the basis of the proportion of the distances from the turning center PT to the respective wheels 11 and the minimum wheel speed.

Figure 8:
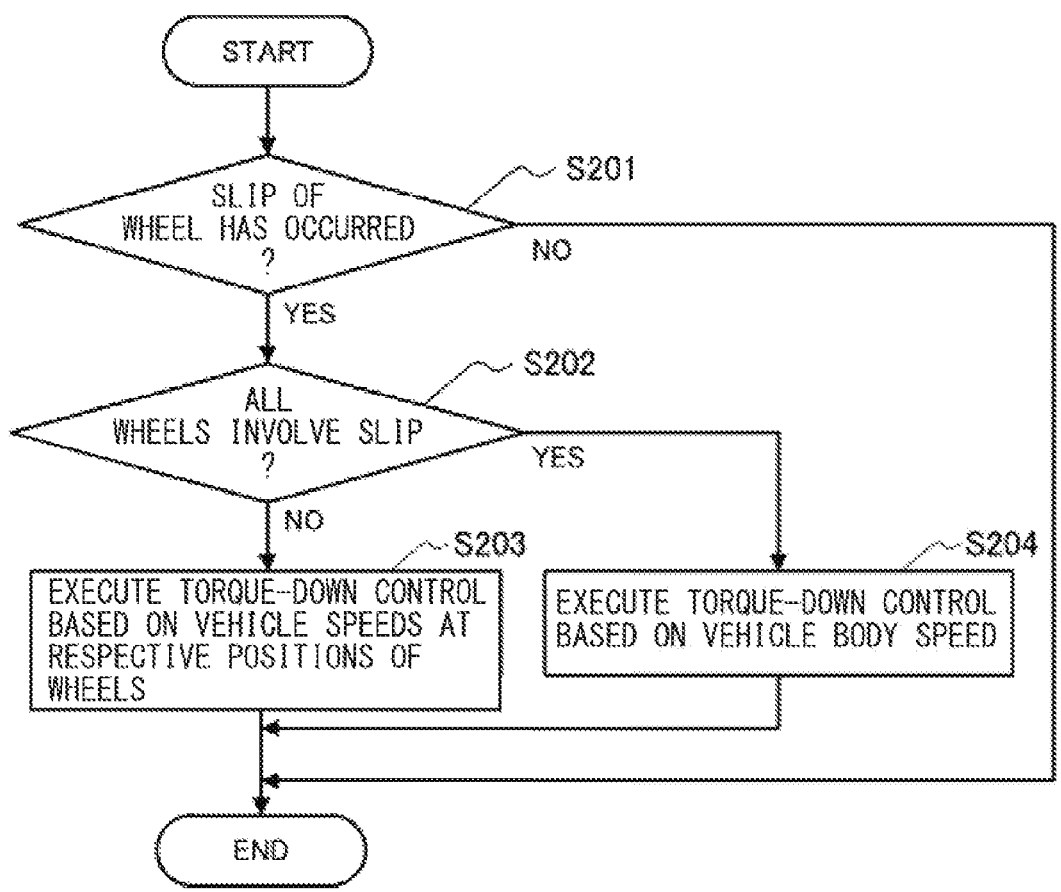
FIG. 8 is a flowchart illustrating an example of a flow of a process that is to be performed by the control apparatus according to one example embodiment of the technology and that is related to a torque-down control.

FIG. 8 is a flowchart illustrating an example of a flow of a process that is to be performed by the control apparatus 100 and related to the torque-down control. A control flow illustrated in FIG. 8 may be started in a case where the torque-down control is not in execution. For example, the control flow illustrated in FIG. 8 may be performed in parallel with the control flow illustrated in FIG. 6.

Upon the start of the control flow illustrated in FIG. 8, the control apparatus 100 may first determine whether the slip of the wheel 11 has occurred in step S201. If the control apparatus 100 determines that the slip of the wheel 11 has occurred (step S201: YES), the control apparatus 100 may cause the control flow to proceed to step S202. If the control apparatus 100 determines that no slip of the wheel 11 has occurred (step S201: NO), the control apparatus 100 may cause the control flow illustrated in FIG. 8 to end.

In step S201, for example, the control apparatus 100 may determine whether the slip of each of the wheels 11 has occurred by calculating the slip rates of the respective wheels 11 on the basis of the vehicle speeds at the respective positions of the wheels 11 estimated by the estimator 120 and comparing the slip rates of the respective wheels 11 with the reference slip rate. The reference slip rate may be a value that makes it possible to appropriately determine as to whether the wheel 11 involves the slip to the extent that a behavior of the body of the vehicle 1 becomes unstable. For example, the reference slip rate may be stored in advance in the memory element of the control apparatus 100. The control apparatus 100 may make the YES determination in step S201 if the control apparatus 100 determines in step S201 that the slip has occurred for at least one of the wheels 11. The control apparatus 100 may make the NO determination in step S201 if the control apparatus 100 determines in step S201 that no slip has occurred for any of the wheels 11.

Note that a process of making the determination in step S201 is not necessarily limited to an example described above. In some embodiments, the control apparatus 100 may determine whether the slip of each of the wheels 11 has occurred on the basis of a time change amount of the rotational speed of each of the drive motors 13.

If the control apparatus 100 makes the YES determination in step S201, the control apparatus 100 may determine whether all of the wheels 11 involve the slip in step S202. If the control apparatus 100 determines that all of the wheels 11 do not involve the slip (step S202: NO), the control apparatus 100 may cause the control flow to proceed to step S203. In step S203, the control apparatus 100 may execute the torque-down control that is based on the vehicle speeds at the respective positions of the wheels 11 estimated by the estimator 120. If the control apparatus 100 determines that all of the wheels 11 involve the slip (step S202: YES), the control apparatus 100 may cause the control flow to proceed to step S204. In step S204, the control apparatus 100 may execute the torque-down control that is based on the vehicle body speed acquired from the vehicle body speed sensor 23. The control apparatus 100 may end the torque-down control in a case where a predetermined end condition is satisfied, and cause the control flow illustrated in FIG. 8 to end thereafter.

The processor 130 of the control apparatus 100 may refrain from performing the torque-down control that controls the slip rate on the basis of the vehicle speeds at the respective positions of the wheels 11 estimated by the estimator 120, in a case where all of the wheels 11 of the vehicle 1 involve the slip as described above. One reason is that, in a case where all of the wheels 11 involve the slip, the wheel 11 having the minimum wheel speed also involves the slip and hence the wheel speed of the wheel having the minimum wheel speed is deviated from the vehicle speed at the position of that wheel 11. This makes the vehicle speeds at the respective positions of the wheels 11 estimated by the estimator 120 easier to deviate from the actual vehicle speeds at the respective positions of the wheels 11. Accordingly, in such a case, the control of the slip rate may be optimized by executing the torque-down control that is based on the vehicle body speed, rather than executing the torque-down control that is based on the vehicle speeds at the respective positions of the wheels 11 estimated by the estimator 120.

Note that an example is described above where the process of estimating the vehicle speeds at the respective positions of the wheels 11 by the estimator 120 is performed regardless of a result of the determination as to whether all of the wheels 11 of the vehicle 1 involve the slip. In some embodiments, the estimator 120 may refrain from performing the process of estimating the vehicle speeds at the respective positions of the wheels 11, in a case where all of the wheels 11 of the vehicle 1 are determined as involving the slip.

Described next is some example effects of the control apparatus 100 according to an example embodiment of the technology.

In the control apparatus 100 according to an example embodiment, the acquiring unit 110 acquires the wheel speeds of the respective wheels 11 of the vehicle 1 and the steering angle of the vehicle 1. Further, the estimator 120 estimates the vehicle speeds at the respective positions of the wheels 11, on the basis of the minimum wheel speed among the wheel speeds of the respective wheels 11 and the steering angle. Thus, it is possible to appropriately estimate the vehicle speeds at the respective positions of the wheels 11, by focusing on the wheel speed of the wheel 11 having the minimum wheel speed which basically coincides with the vehicle speed at the position of that wheel 11. Hence, it is possible to optimize the control of the slip rate and the slip determination. In some embodiments, the estimator 120 may estimate the vehicle speeds at the respective positions of the wheels 11, on the basis of the relationship between the steering angle and the turning radius R of the vehicle 1, and on the basis of the relationship between the turning radius R and the distances from the turning center PT of the vehicle 1 to the respective wheels 11. Hence, it is possible to more appropriately estimate the vehicle speeds at the respective positions of the wheels 11 by utilizing, for example, the Ackermann theory.

In some embodiments, the control apparatus 100 may further include the processor 130 that controls the slip rate of each of the wheels 11, on the basis of the vehicle speeds at the respective positions of the wheels 11 estimated by the estimator 120. Thus, it is possible to suppress the deviation of the calculated value of the slip rate from the actual slip rate, and control the slip rate on the basis of such a calculated value of the slip rate. Hence, it is possible to appropriately control the slip rate.

In some embodiments, the processor 130 may refrain from performing the control of the slip rate that is based on the vehicle speeds at the respective positions of the wheels 11 estimated by the estimator 120, in a case where all of the wheels 11 of the vehicle 1 involve the slip. Hence, it is possible to appropriately control the slip rate in a case where the wheel speed of the wheel 11 having the minimum wheel speed is deviated from the vehicle speed at the position of that wheel 11, by executing, for example, the control of the slip rate that is based on the vehicle body speed.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, a configuration of the vehicle 1 has been described above with reference to FIG. 1. However, a configuration of the vehicle according to any embodiment of the technology, however, is not limited thereto. In some embodiments, the vehicle may have a configuration in which a part of components of the vehicle 1 illustrated in FIG. 1 is eliminated, changed, and/or any other component may be added to the components of the vehicle 1 illustrated in FIG. 1. In some embodiments, the vehicle may include two drive motors including a front wheel drive motor that drives the left front wheel 11a and the right front wheel 11b and a rear wheel drive motor that drives the left rear wheel 11c and the right rear wheel 11d. In such example embodiments, the vehicle speeds of the respective wheels 11 may be acquired by providing a wheel speed sensor for each of the wheels 11. In some embodiments, all or a part of the drive sources of the vehicle may be a drive source other than the drive motor, such as an engine.

For example, the processes described with reference to the flowcharts according to an example embodiment described above do not necessarily have to be executed in the order illustrated in the flowcharts. In some embodiments, the flowcharts described above each may have an additional process step. In some embodiments, a part of the process steps may be eliminated from each of the flowcharts described above.

The control apparatus 100 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control apparatus illustrated in FIGS. 1 and 2.

The invention claimed is:

1. A control apparatus to be applied to a vehicle, the control apparatus comprising:
an acquiring unit including a sensor, the acquiring unit configured to acquire a first wheel speed of a first wheel of the vehicle, a second wheel speed of a second wheel of the vehicle, and a steering angle of the vehicle; and
a processor communicably connected with at least the sensor, the processor configured to
estimate a first vehicle speed at a first respective position of the first wheel and a second vehicle speed at a second respective position of the second wheel, and
control torques of the respective first and second wheels based on at least the estimated first vehicle speed and the estimated second vehicle speed in a predetermined traveling state of the vehicle, wherein
the processor is configured to estimate the first vehicle speed at the first respective position and the second vehicle speed at the second respective position based on (i) a minimum wheel speed among the first wheel speed of the first wheel and the second wheel speed of the second wheel, and (ii) the steering angle,
the processor is further configured to control a slip rate of each of the respective first and second wheels, on a basis of the estimated first and second vehicle speeds at the respective first and second positions of the respective first and second wheels, and
the processor is configured to refrain from performing a control of the slip rate that is based on the estimated first and second vehicle speeds at the respective first and second positions of the respective first and second wheels, in a case where both of the respective first and second wheels of the vehicle involve a slip.

2. The control apparatus according to claim 1, wherein the processor is configured to estimate the first and second vehicle speeds at the respective first and second positions of the respective first and second wheels, on a basis of a relationship between the steering angle and a turning radius of the vehicle, and on a basis of a relationship between the turning radius and distances from a turning center of the vehicle to the respective first and second wheels.

3. A control apparatus to be applied to a vehicle, the control apparatus comprising
circuitry configured to
acquire a first wheel speed of a first wheel of the vehicle, a second wheel speed of a second wheel of the vehicle, and a steering angle of the vehicle, and
estimate a first vehicle speed at a first respective position of the first wheel and a second vehicle speed at a second respective position of the second wheel, and
control torques of the respective first and second wheels based on at least the estimated first vehicle speed and the estimated second vehicle speed, wherein
the circuitry is configured to estimate the first vehicle speed at the first respective position and the second vehicle speed at the second respective position based on (i) a minimum wheel speed among the first wheel speed of the first wheel and the second wheel speed of the second wheel, and (ii) the steering angle,
the circuitry is further configured to control a slip rate of each of the respective first and second wheels, on a basis of the estimated first and second vehicle speeds at the respective first and second positions of the respective first and second wheels, and
the circuitry is configured to refrain from performing a control of the slip rate that is based on the estimated first and second vehicle speeds at the respective first and second positions of the respective first and second wheels, in a case where both of the respective first and second wheels of the vehicle involve a slip.

* * * * *